United States Patent
Ren et al.

(10) Patent No.: US 8,566,317 B1
(45) Date of Patent: Oct. 22, 2013

(54) APPARATUS AND METHODS FOR SCALABLE OBJECT CLUSTERING

(75) Inventors: Liwei Ren, Sunnyvale, CA (US); Wei Yan, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 286 days.

(21) Appl. No.: 12/683,350

(22) Filed: Jan. 6, 2010

(51) Int. Cl.
*G06F 17/30* (2006.01)

(52) U.S. Cl.
USPC ............................. 707/737; 707/738; 726/23

(58) Field of Classification Search
USPC .................. 707/737, 738, 999.003–999.004; 726/23, 26
See application file for complete search history.

(56) References Cited

U.S. PATENT DOCUMENTS

| | | |
|---|---|---|
| 2005/0060643 A1* | 3/2005 | Glass et al. ................ 715/501.1 |
| 2006/0253438 A1* | 11/2006 | Ren et al. ......................... 707/5 |
| 2007/0078849 A1 | 4/2007 | Slothouber |
| 2007/0124582 A1 | 5/2007 | Shannon et al. |
| 2008/0201779 A1* | 8/2008 | Tahan et al. ..................... 726/23 |
| 2008/0222135 A1 | 9/2008 | Chayes et al. |
| 2008/0222725 A1 | 9/2008 | Chayes et al. |
| 2008/0222726 A1 | 9/2008 | Chayes et al. |
| 2008/0275902 A1 | 11/2008 | Burges et al. |
| 2009/0089244 A1 | 4/2009 | Donato et al. |
| 2009/0216841 A1 | 8/2009 | Choi et al. |
| 2009/0254989 A1 | 10/2009 | Achan et al. |
| 2010/0082800 A1 | 4/2010 | Wei et al. |

* cited by examiner

*Primary Examiner* — Monica Pyo
(74) *Attorney, Agent, or Firm* — Okamoto & Benedicto LLP (57) ABSTRACT

One embodiment relates to an apparatus configured to efficiently group a set of strings into clusters of related strings. Data storage is configured to store computer-readable code and data, and a processor is configured to access the data storage and to execute said computer-readable code. Computer-readable code is configured to receive the set of strings, determine an evaluation function between pairs of strings in said set, and group the strings into clusters, wherein determining the evaluation function between pairs of strings utilizes hash tables. Another embodiment relates to a computer-implemented method of efficiently grouping a set of strings into clusters of related strings based on rules of inference. Other embodiments and features are also disclosed.

19 Claims, 6 Drawing Sheets

| k \ j: | 1 | 2 | 3 | 4 | 5 | 6 | 7 | 8 | 9 |
|---|---|---|---|---|---|---|---|---|---|
| 2 | 0 | | | | | | | | |
| 3 | 0 | 0 | | | | | | | |
| 4 | 0 | 1 | * | | | | | | |
| 5 | 0 | 1 | * | * | | | | | |
| 6 | 0 | 0 | 1 | * | * | | | | |
| 7 | 0 | 0 | 0 | * | * | * | | | |
| 8 | 0 | 0 | 0 | * | * | * | 1 | | |
| 9 | 0 | 0 | 0 | * | * | * | 1 | * | |

APPARATUS AND METHODS FOR SCALABLE OBJECT CLUSTERING

BACKGROUND OF THE INVENTION

1. Field of the Invention

The present invention relates generally to the field of object clustering, especially, to the multiple fields of malware classification, spam clustering and document clustering.

2. Description of the Background Art

In the field of anti-malware (anti-virus) technology, the traditional classification approach is based on malware behaviors. However, applicants have determined that this traditional classification approach leads to a disadvantageously high rate of false positive identifications.

Other classification approaches have been based on a suffix tree, largest common substrings, and the like. However, these techniques do not scale well when there is a need to cluster a very large number of objects, such as malware variants. This is due to reasons of either slow performance or very large memory consumption.

SUMMARY

The present disclosure provides a novel and inventive technique for object classification. This technique is advantageously scalable to large sets of objects and may be applied, for example, in the areas of anti-malware, anti-spam, and data leakage prevention.

One embodiment relates to an apparatus configured to efficiently group a set of strings into clusters of related strings. Data storage is configured to store computer-readable code and data, and a processor is configured to access the data storage and to execute said computer-readable code. Computer-readable code is configured to receive the set of strings, determine an evaluation function between pairs of strings in said set, and group the strings into clusters, wherein determining the evaluation function between pairs of strings utilizes hash tables.

Another embodiment relates to a computer-implemented method of efficiently grouping a set of strings into clusters of related strings. The set of strings is received. An evaluation function between pairs of strings in said set is determined utilizing hash tables, and the strings are grouped into clusters. Determining the evaluation function between the pairs of strings is performed utilizing hash tables which are generated using a rolling hash function.

These and other features of the present invention will be readily apparent to persons of ordinary skill in the art upon reading the entirety of this disclosure, which includes the accompanying drawings and claims.

DETAILED DESCRIPTION

In the fields of anti-malware (anti-virus), anti-spam and data leakage prevention (DLP), there are situations that require the aggregation of digital objects which are variants of each other. The variants may be considered to be members of a same family of such objects.

In the anti-malware field, applicants have determined that it is desirable to determine signatures for use in efficiently and reliably identifying a family of malware (i.e. malware which are variants of each other). Such family-based identification advantageously reduces the footprint (storage size) of the signature database which is used by the malware detection engine. In addition, the malware family signatures may be beneficially utilized to detect previously-unknown variants of the same malware family.

Similarly, in the anti-spam field, applicants have determined that it is desirable to determine signatures for use in efficiently and reliably identifying a family of bulk-sent spam messages (i.e. spam messages which are variants of each other). Such family-based identification advantageously reduces the footprint (storage size) of the signature database which is used by the spam detection engine. In addition, the spam family signatures may be beneficially utilized to detect previously-unknown variants of the same spam family.

Furthermore, in the data leakage prevention field, applicants have determined that it is desirable to determine signatures for use in efficiently and reliably identifying a family of related documents (i.e. documents which are variants of each other). Such family-based identification advantageously reduces the footprint (storage size) of the signature database which is used by the matching engine of the DLP system. In addition, the document family signatures may be beneficially utilized to detect previously-unknown variants of the same family of documents.

Use Cases

Given a collection of digital objects that can be normalized into strings, one is expected to cluster them together based on their similarity measured by common sub-strings with minimum length. The common sub-strings usually come with the genealogy of the object family. Object classes such as malware, spam, email and documents all have the same nature in this regard. Essentially, the problem of object clustering, once the objects are normalized, becomes the problem of string clustering.

Use Case 1:

Given a collection of malwares, we may normalize them into binary strings by various techniques, or combinations thereof: unpacking the packed ones by tools such as an unpacker or SandBox; extracting only the text sections from the malware payload; and de-noising padding bytes. An advantageous practical use of this technique is to aggregate malware from the same family into one cluster or several clusters.

Use Case 2:

Given a collection of malicious scripts, we may normalize them into ASCII strings by various techniques, or combinations thereof: removing the comments; remove repeated ASCII characters; and remove non-informative characters, such as white spaces, control characters and the like. An advantageous practical use of this technique is to aggregate malicious scripts from the same family into one cluster or several clusters.

Use Case 3:

In the area of bulk-sent spam filtering, the bulk spam messages are near duplicated email messages. In order to generate efficient spam fingerprints with minimum size, one needs to cluster all the near-duplicated spam messages together. We may normalize each spam by various techniques, or combinations thereof: extract the text body (and attachment) from the emails; translate them into texts in UTF-8 encoding so that all languages may be dealt with uniformly; and remove useless characters, such as white spaces, control characters, etc.; and remove repeated characters such as "----------------------" or "==================" and so forth. An advantageous practical use of this technique is to aggregate all near-duplicated spam messages into one cluster or several clusters.

Use Case 4:

In a document management system (for example, a source code control system) or a data leakage prevention system, it is advantageously useful to identify partially-duplicated documents using an effective clustering technique. We may normalize the document by various techniques, or combinations thereof: extract the textual part from file formats, such as Word, PDF and others; translate them into texts in UTF-8 encoding so that all languages may be dealt with uniformly; remove useless characters, such as white spaces, control characters, etc.; and remove repeated characters. An advantageous practical use of this technique is to aggregate all partially-duplicated documents into one cluster or several clusters.

After normalization of the objects, the above-discussed four types of digital objects each become strings. Hence, the clustering technique disclosed herein may be advantageously used to aggregate each of these types of objects.

Assumptions, Definitions, and Rules of Inference

The following are assumptions and definitions for the clustering techniques described below.

Assume the following inputs:

1. A pair of strings $S_a$ and $S_b$, or string S and a set of strings $\{S_1, S_2, \ldots, S_m\}$
2. Minimum string length K
3. Threshold percentile X %
4. Threshold positive integer N Definition of Common Sub-Strings:

If a string with length ≥K is a sub-string of both strings $S_1$ and $S_2$, it is a common sub-string of those two strings.

Definition of the Cluster Evaluation Function ("EVAL"):

EVAL($S_a$, $S_b$)=1 if either of the following holds true.

2* Length(common sub-strings)/[Length($S_a$)+Length($S_b$)]>X %, where Length(common sub-strings) is the length of all non-overlapping common sub-strings of $S_a$ and $S_b$, and Length ($S_i$) is the length of string $S_i$; or Number (common sub-strings)>N, where Number(common sub-strings) is the number of all non-overlapping common sub-strings of $S_1$ and $S_2$.

Else EVAL($S_1$, $S_2$)=0.

Rules of Inference for Cluster Membership:

1. If EVAL($S_1$,$S_2$)=1, then $S_1$ and $S_2$ belong to the same cluster.
2. If [$S_1$ and $S_2$ belong to a cluster] and [$S_2$ and $S_3$ belong to a cluster], then $S_1$, $S_2$ and $S_3$ belong to the same cluster.
3. If [$S_1$ and $S_2$ belong to the same cluster] and [$S_1$ and $S_3$ do not belong to the same cluster], then $S_2$ and $S_3$ do not belong to the same cluster.

I. Evaluating a Pair of Strings

The present application discloses a first innovative computer-implemented technique which, given a pair of strings ($S_1$, $S_2$), extracts, in an approximate manner, all common sub-strings with a pre-defined minimum length K. This technique calculates EVAL($S_1$, $S_2$).

Figure 1:
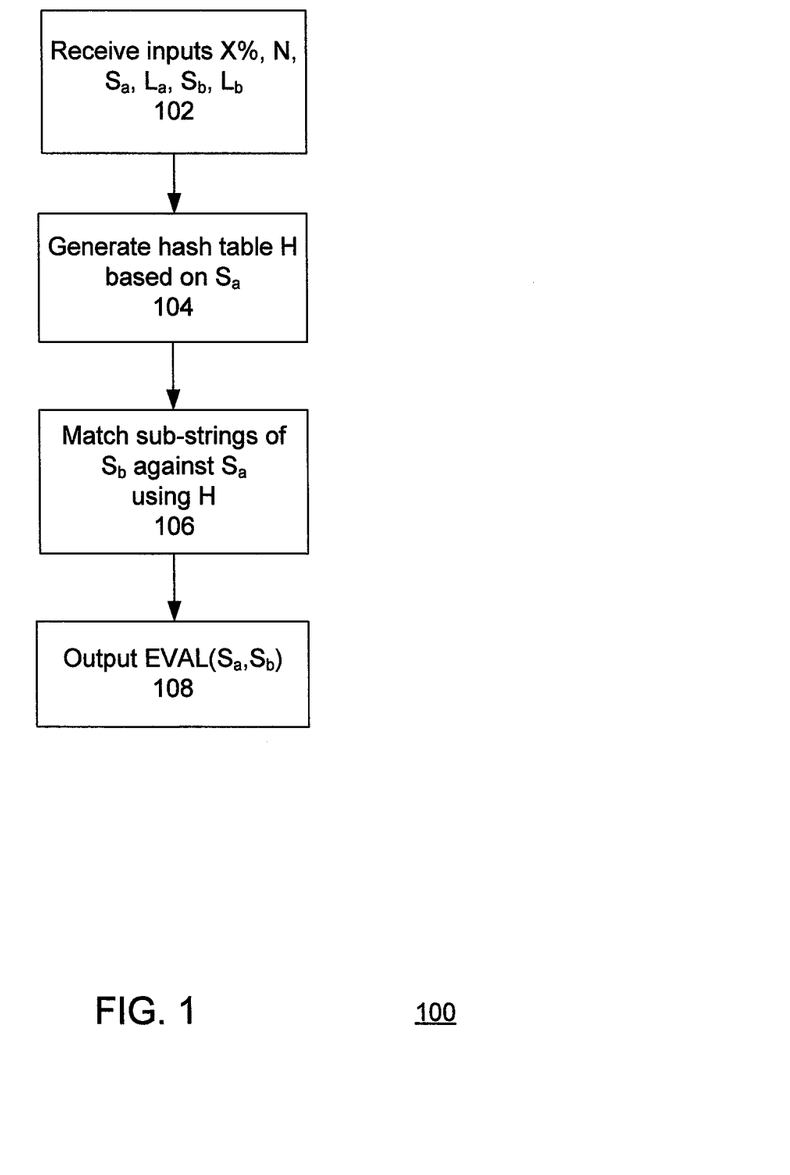
FIG. 1 is a flow chart showing a method of efficiently evaluating a relation between two strings in accordance with an embodiment of the invention.

In accordance with an embodiment of this invention, a method of efficiently evaluating a relation between two strings is shown in the flow chart of FIG. 1. As shown, the inputs received 102 are: threshold percentile X %; threshold positive integer N; string $S_a$; string $S_b$; length $L_a$ (of string $S_a$); and length $L_b$ (of string $S_b$). A hash table H is the generated 104 based on the first input string $S_a$. Preferably, hash records for the first ($L_a$−K+1) sub-strings of $S_a$ with length K are generated, and hash collisions are resolved by chaining hash records. A hash record contains the offset position of the associated sub-string in $S_a$. In one implementation, a rolling hash function, such as a Karp-Rabin hash function, may be utilized with efficiency.

Figure 2:
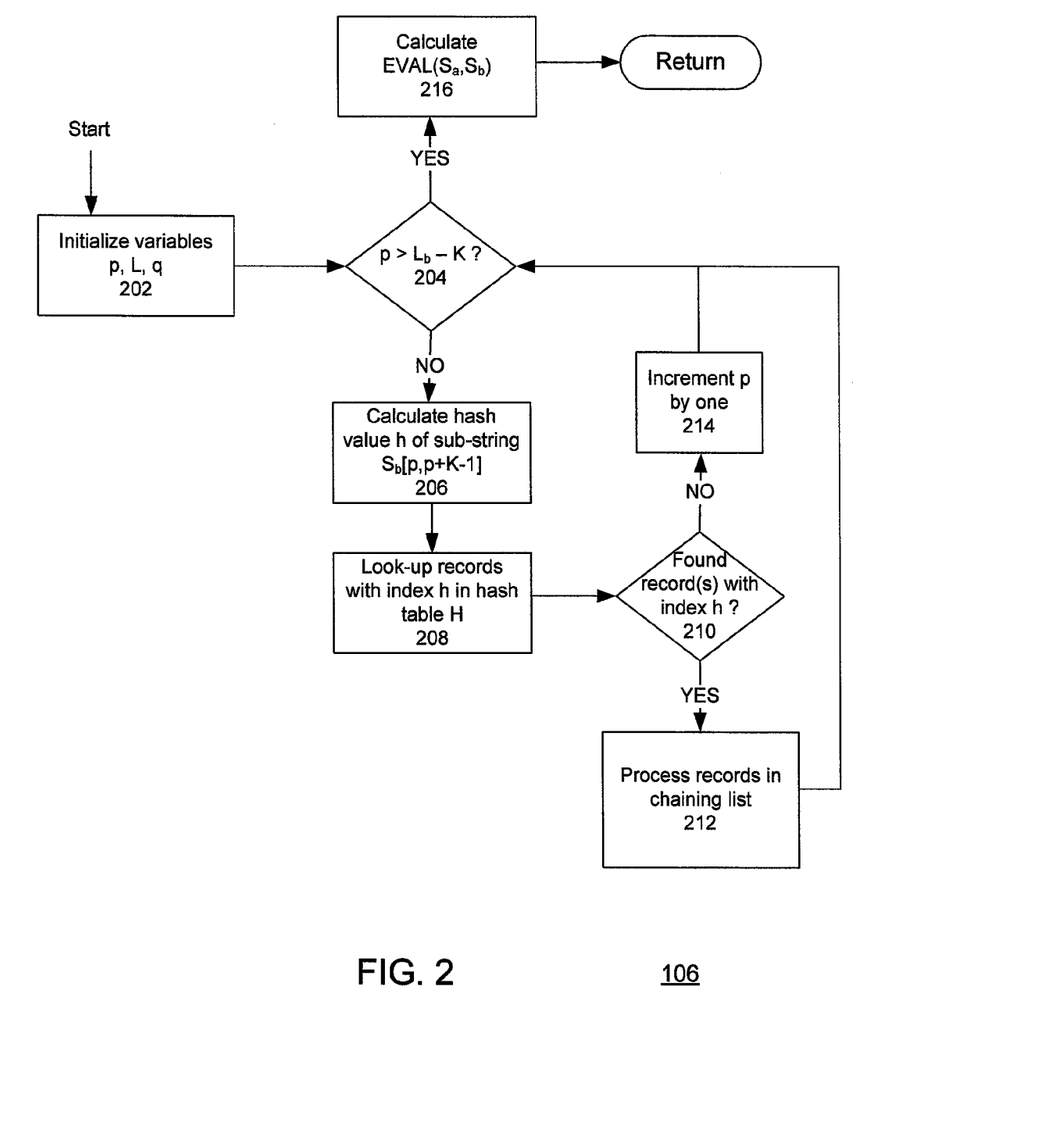
FIG. 2 is a flow chart showing a procedure for matching sub-strings of a string against another string using a hash table in accordance with an embodiment of the invention.

Matching 106 is then performed. In this case, sub-strings of the second sub-string $S_b$ are matched against $S_a$ using the hash table H. A procedure to perform the matching 106 is depicted in FIG. 2 and is described further below. The output 108 of this method 100 is the evaluation function EVAL($S_a$,$S_b$).

FIG. 2 is a flow chart showing a procedure for matching 106 sub-strings of a string against another string using a hash table in accordance with an embodiment of the invention. The procedure begins by initializing the pointer p, the cumulative match length L, and "hit" counter q, each to zero (i.e. p=0, L=0, and q=0). A determination 204 is then made as to whether the pointer p is greater than $L_b$−K.

If the determination 204 indicates that pointer p≤$L_b$−K, then a calculation is made 206 of the hash value h of substring $S_b$[p,p+K−1], where $S_i$[x,y] is a sub-string of $S_i$ which starts at offset position x and ends at offset position y. The hash value h is then used to look up 208 records with index h in hash table H.

Figure 3:
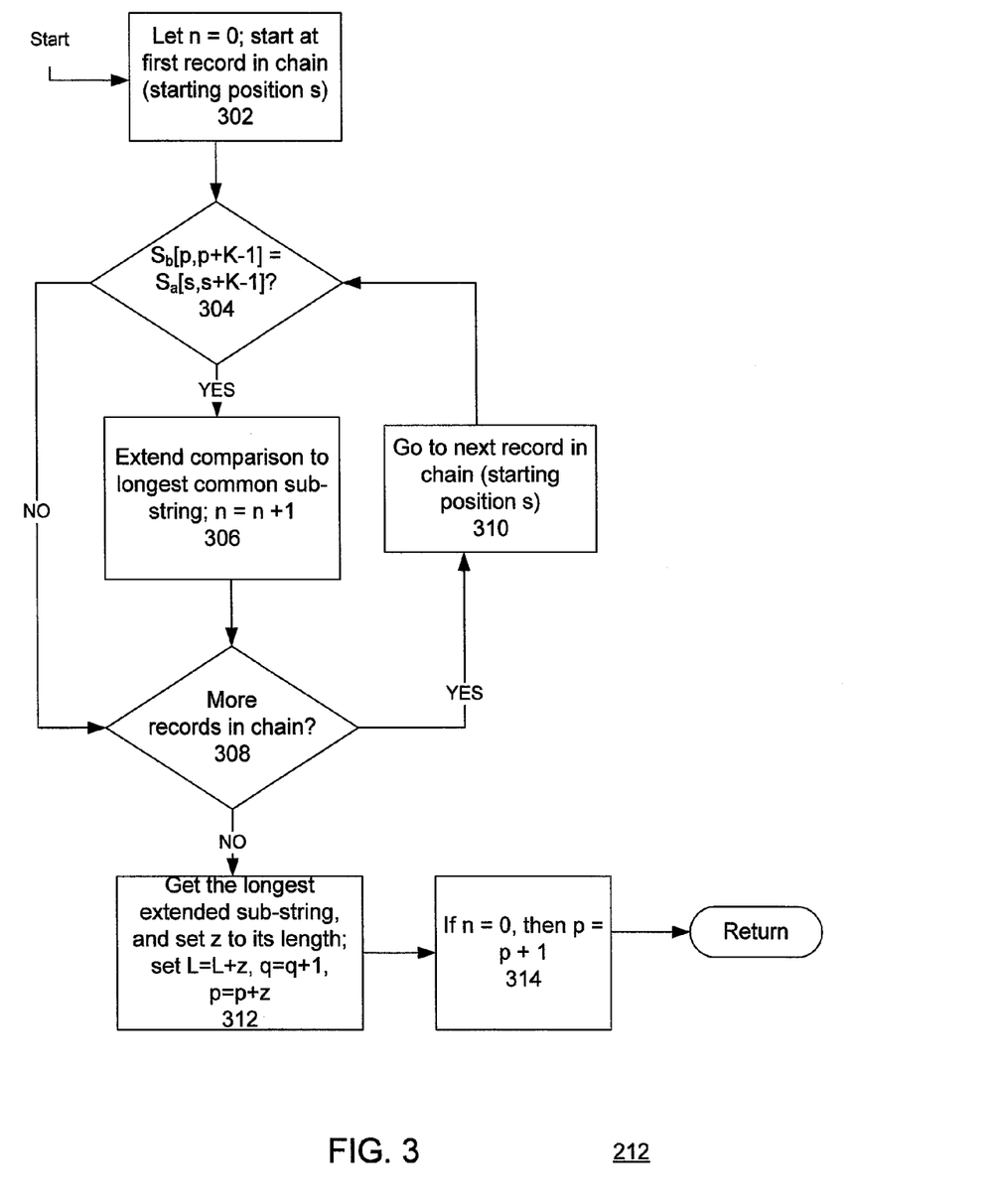
FIG. 3 is a flow chart showing a procedure for processing matching records in a chaining list in accordance with an embodiment of the invention.

A determination 210 is made as to whether or not a record or records were found. If the look-up indicates there is at least one matching record (i.e. the look-up indicates a "hit"), then the record or records in the chaining list are processed 212. A procedure to process 212 the record(s) is depicted in FIG. 3 and described further below. On the other hand, if the look-up indicates there is no matching record, then the processing per block 212 is skipped, the pointer p is incremented by one, and the procedure loops back to the determination in block 204.

Once the determination 204 indicates that pointer p>$L_b$−K, then the last sub-string of the minimum length K in $L_b$ has been processed. Hence, the procedure goes on to calculate 216 the evaluation function EVAL($S_a$,$S_b$) and then return. In one embodiment, as described above, EVAL($S_a$,$S_b$)=1 if either of two threshold conditions is passed. A first threshold condition is 2*Length(common sub-strings)/[Length($S_a$)+Length($S_b$)]=2L/($L_a L_b$)>X %, where L=Length(common sub-strings) is the length of all non-overlapping common sub-strings of $S_a$ and $S_b$, $L_a$=Length ($S_a$) is the length of string $S_a$, and $L_b$=Length ($S_b$) is the length of string $S_b$. A second threshold condition is that: q=Number (common sub-strings)> N, where Number(common sub-strings) is an approximate number of all non-overlapping common sub-strings of $S_a$ and $S_b$. If neither of the two threshold conditions is passed, then EVAL($S_a$,$S_b$)=0.

FIG. 3 is a flow chart showing a procedure for processing 212 matching records in a chaining list in accordance with an embodiment of the invention. The processing 212 begins 302 by setting the counter n to zero, and starts at the first record in the chain. The starting offset position of the hashed sub-string of $S_a$ being processed is denoted by the variable s.

A determination is made 304 as to whether the sub-string $S_b[p,p+K-1]$ matches the sub-string $S_a[s,s+K-1]$. If there is a match, then the procedure extends 306 the comparison to the longest common sub-string (starting at offset position p in $S_b$ and at offset position s in $S_a$) and increments the counter n by one.

Thereafter, a determination is made 308 as to whether there are more records in the chain. If there are more records in the chain, then the procedure goes 310 to the next record in the chain and loops back to block 304. If there are no more records in the chain, then the procedure gets 312 the longest extended sub-string match, and sets z to the length of that match. In addition, the pointer p is incremented by z, the cumulative match length L is also incremented by z, the "hit" counter q is incremented by 1.

A determination 314 is then made as to whether n=0 (which would indicate that no match was found based on this "hit" to the hash table). If so, then the pointer p is incremented by one. The procedure then returns.

II. Evaluating a String Against a Set of Strings

The present application also discloses a second innovative computer-implemented technique which, given a string S and a set of strings $\{S_1, S_2, \ldots, S_m\}$, extracts all common sub-strings with a pre-defined minimum length K for the pairs $<S, S_1>, <S, S_2>, <S, S_m>$. This technique calculates EVAL$(S, S_1)$, EVAL$(S, S_2)$, ..., EVAL$(S, S_m)$ in an advantageously efficient manner. The processing cost to perform the second technique is approximately half the processing cost to perform the first technique m times independently.

Figure 4:
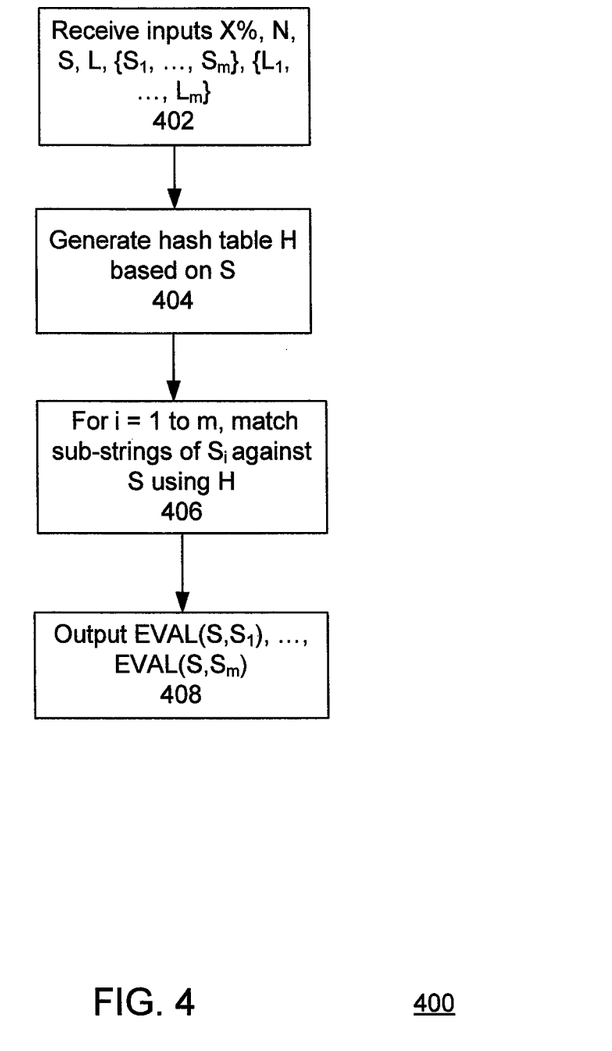
FIG. 4 is a flow chart showing a method of efficiently evaluating relations between a string and a set of strings in accordance with an embodiment of the invention.

In accordance with an embodiment of this invention, a method of efficiently evaluating relations between a string and a set of strings is shown in the flow chart of FIG. 4. As shown, the inputs received 402 are: threshold percentile X %; threshold positive integer N; string S; length L (of string S); a set of strings $\{S_1, S_2, \ldots, S_m\}$; and a set of lengths $\{L_1, L_2, \ldots, L_m\}$ (of the set of strings $\{S_1, S_2, \ldots, S_m\}$). A hash table H is the generated 404 based on the string S. Preferably, hash records for the first (L−K+1) sub-strings of S with length K are generated, and hash collisions are resolved by chaining hash records. A hash record contains the offset position of the associated sub-string in S. In one implementation, a rolling hash function, such as a Karp-Rabin hash function, may be utilized with efficiency.

Matching 406 is then performed. For i=1 to m, the sub-strings of $S_i$ are matched against the string S using the hash table H. Each of the m matchings may be performed by the procedure depicted in FIG. 2 and described above, where S is substituted for $S_a$, and $S_i$ is substituted for $S_b$. The output 408 of this method 400 is the set of evaluation functions EVAL$(S,S_1)$, EVAL$(S,S_2)$, ..., and EVAL$(S,S_m)$.

III. Grouping Strings in a Set into Clusters

The present application further discloses an innovative computer-implemented technique which, given a set of strings $\{S_1, S_2, \ldots, S_m\}$, determines clusters of related strings in the set. The clusters are determined efficiently using the following principles. First, unnecessary calculation between two irrelevant strings is minimized. Second, the rules of inference described above are used. Third, the second technique described above is applied adaptively. The processing cost to perform the third technique substantially less than the processing cost to perform the second technique m times independently.

In accordance with an embodiment of this invention, a method 500 of efficiently clustering string objects based on their evaluated relations is shown below in Table 1.

TABLE 1

INPUT: X%,N, set of strings $\{S_1, S_2, \ldots, S_m\}$ and their length $\{L_1, L_2, \ldots, L_m\}$
FOR j = 1 TO m
  1.  If $S_j$ already belongs to a cluster, skip step 2 (according to $3^{rd}$ Rule of Inference) and go directly to next j. Otherwise do step 2.
  2.  For each k satisfying the conditions j+1 ≤ k ≤ m and $S_k$ not yet belonging to any cluster,
     a.  Calculate EVAL$(S_j, S_k)$
     b.  If EVAL$(S_j, S_k)$=1, then
        i.  If $S_j$ does not belong to any cluster, create a cluster and assign $S_j$, $S_k$ to this cluster.
        ii.  Otherwise, if $S_j$ already belongs to a cluster, assign $S_k$ to this cluster.
     Next k
Next j
OUTPUT: The set of clusters As shown in Table 1, the inputs received are: threshold percentile X %; threshold positive integer N; a set of strings $\{S_1, S_2, \ldots, S_m\}$; and a set of lengths $\{L_1, L_2, \ldots, L_m\}$ (of the set of strings $\{S_1, S_2, \ldots, S_m\}$).

For j=1 to m, the following procedure is performed.

Per step 1, a determination is made as to whether $S_j$ already belongs to a cluster. If Sj belongs to a cluster already, then skip step 2 (per the $3^{rd}$ Rule of Inference mentioned above) and go directly to next j. On the other hand, if $S_j$ does not yet belong to a cluster, then step 2 is performed.

Per step 2, for each k satisfying the conditions j+1≤k≤m, and $S_k$ not yet belonging to any cluster, the following steps are performed. Per step 2a, a determination is made of the evaluation function EVAL$(S_j,S_k)$. Per step 2b, if EVAL$(S_j,S_k)$=1, then steps i and ii are performed. Per step i, if $S_j$ does not belong to any cluster, then a new cluster is created, and $S_j$ and $S_k$ are assigned to this newly-created cluster. Per step ii, otherwise if $S_j$ already belongs to an existing cluster, then $S_k$ is assigned to this existing cluster.

Note that EVAL$(S_j,S_k)$ in step 2 may be determined efficiently by applying the procedure 400 of FIG. 4. In this case, the single string S=$S_j$, and the set of strings is $\{S_k | j+1 \le k \le m$ and ($S_k$ not yet belonging to any cluster)$\}$.

Figure 5:
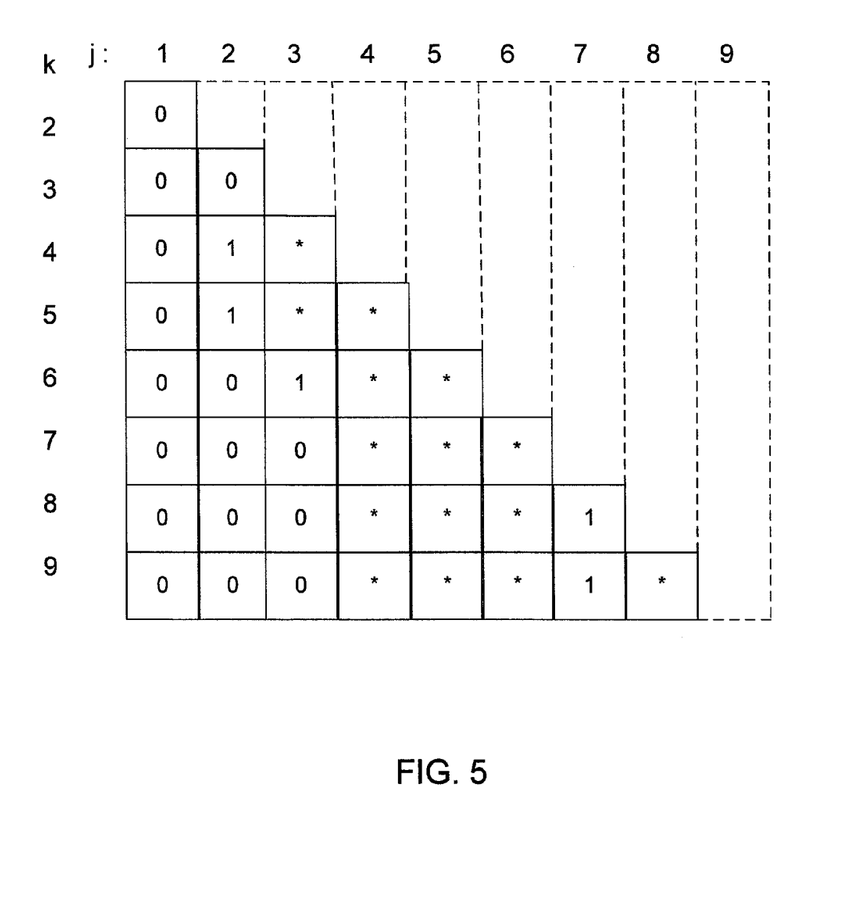
FIG. 5 is a schematic diagram of example evaluated relations between several string objects in accordance with an embodiment of the invention.

FIG. 5 is a schematic diagram of example evaluated relations between several string objects in accordance with an embodiment of the invention. In this example, m=9, and the array shows example values for EVAL$(S_j,S_k)$ for j=1 to 8 and k=2 to 9, where j≠k. Now consider the procedure of Table 1 being applied given this example EVAL$(S_j,S_k)$ function. Note that some of the values of EVAL$(S_j,S_k)$ are skipped, and these skipped values are indicated by a * in FIG. 5.

For j=1, EVAL$(S_j,S_k)$=0 for k=2 to 9, so $S_1$ is not assigned to any cluster (and determined to not belong to any cluster).

For j=2, EVAL$(S_2,S_4)$=1, and $S_2$ does not yet belong to any cluster, so per step 2bi, a new cluster is created, and $S_2$ and $S_4$ are assigned to this first cluster. Subsequently, it is determined that EVAL$(S_2,S_5)$=1, and $S_2$ already belongs to the first cluster, so per step 2bii, $S_5$ is also assigned to the first cluster.

For j=3, $S_4$ and $S_5$ already belong to a cluster, so k=4 and k=5 are skipped. EVAL$(S_3,S_6)$=1, and $S_6$ does not yet belong to any cluster, so per step 2bi, a new cluster is created, and $S_3$ and $S_6$ are assigned to this second cluster.

For j=4, $S_4$ already belongs to the first cluster, so per step 1, the procedure skips to the next j.

For j=5, $S_5$ already belongs to the first cluster, so per step 1, the procedure skips to the next j.

For j=6, $S_6$ already belongs to the second cluster, so per step 1, the procedure skips to the next j.

For j=7, EVAL$(S_7,S_8)$=1, and $S_7$ does not yet belong to any cluster, so per step 2bi, a new cluster is created, and $S_7$ and $S_8$ are assigned to this third cluster. Subsequently, it is determined that EVAL($S_7$,$S_9$)=1, and $S_7$ already belongs to the third cluster, so per step 2bii, $S_9$ is also assigned to the third cluster.

For j=8, $S_8$ already belongs to the third cluster, so per step 1, the procedure skips to the next j.

Lastly or j=9, $S_9$ already belongs to the third cluster, so the procedure goes on to output the set of clusters. In this case, there are three clusters which are output. The first cluster has $S_2$, $S_4$ and $S_5$. The second cluster includes $S_3$ and $S_6$. Finally, the third cluster includes $S_7$, $S_8$, and $S_g$.

Object Clustering Computer Apparatus

Figure 6:
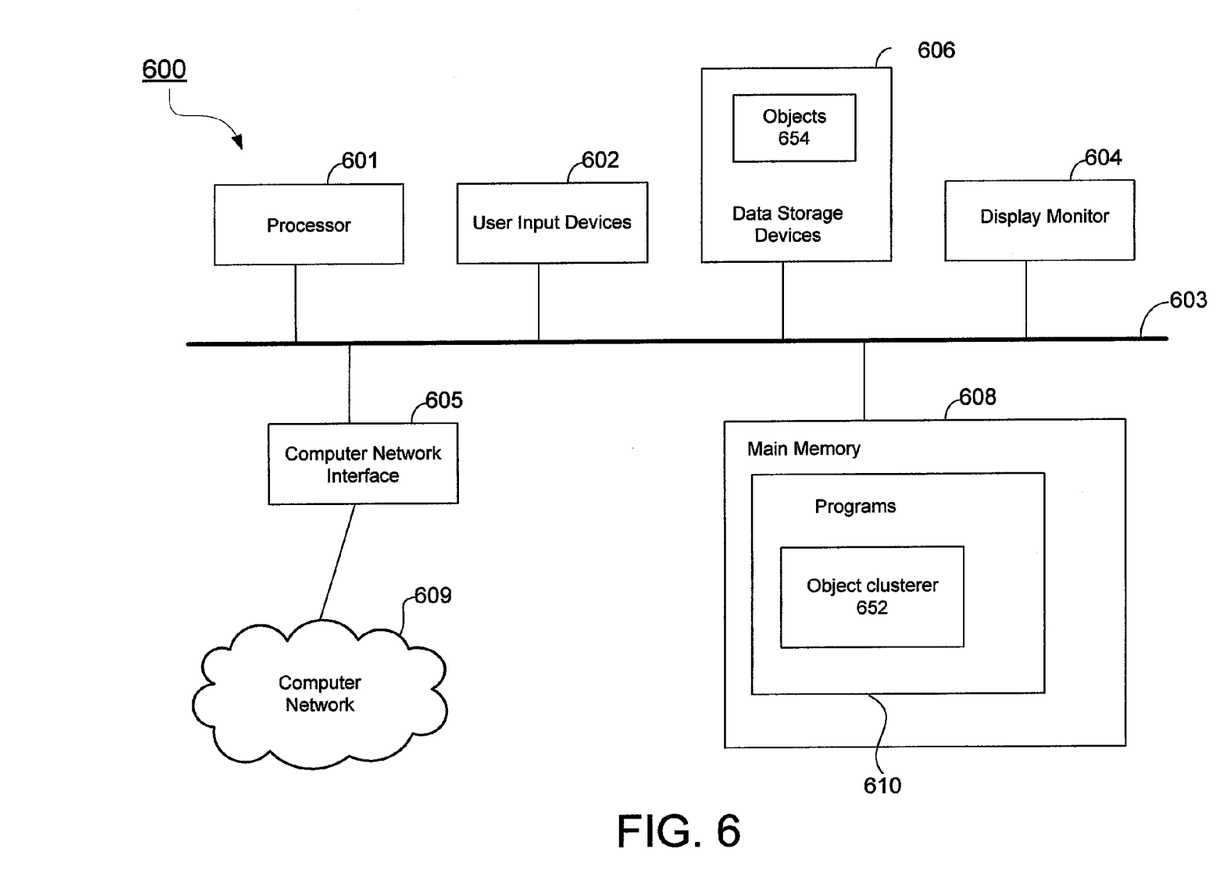
FIG. 6 is a schematic diagram of a computer apparatus configured to perform object clustering in accordance with an embodiment of the invention.

FIG. 6 is a schematic diagram of a computer apparatus 600 configured to perform object clustering in accordance with an embodiment of the invention. For example, the computer apparatus 600 shown in the example of FIG. 6 may be employed as a server computer, and the server computer may be part of an antivirus system, or an anti-spam system, or a data leakage prevention system.

The computer apparatus of FIG. 6 may have less or more components to meet the needs of a particular implementation. As shown in FIG. 6, the computer may include a processor 601, such as those from the Intel Corporation or Advanced Micro Devices, for example. The computer may have one or more buses 603 coupling its various components. The computer may include one or more input devices 602 (e.g., keyboard, mouse, etc.), a display monitor 604 (e.g., LCD, cathode ray tube, flat panel display, etc.), a computer network or communications interface 605 (e.g., network adapters, wireless network adapters, etc.) for communicating over a computer (data) network 609, one or more data storage devices 606 (e.g., hard disk drive, optical drive, FLASH memory, etc.) for storing computer-readable data onto computer-readable media and for reading the data therefrom, and a main memory 608 (e.g., DRAM, SRAM, etc.).

Computer-readable data (including computer-readable program instructions) may be stored in the data storage devices 606 and may be loaded into main memory 608. Computer-readable data may also be received over the computer network 609 by way of a communications interface 605. The main memory 608 may loaded with programs 610 (comprising computer-readable instruction code and data) which may be executed by the processor 601 to perform some of the functionalities as described herein.

In accordance with an embodiment of the present invention, the programs 610 include an object cluster 652. In addition, the data storage devices 654 are configured to hold a database of objects 654 which are advantageously grouped or clustered by the object clusterer 652. In one embodiment, the objects may comprise antivirus signatures which are utilized by an antivirus detection engine. In another embodiment, the objects may comprise spam signatures which are utilized by a spam detection engine. In another embodiment, the objects may comprise document signatures which are utilized by a data leakage prevention system.

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

What is claimed is:

1. An apparatus configured to efficiently group a set of strings into clusters of related strings, the apparatus comprising:
    data storage configured to store computer-readable code and data;
    a processor configured to access the data storage and to execute said computer-readable code;
    computer-readable code configured to receive the set of strings;
    computer-readable code configured to determine a binary output of an evaluation function between a pair of strings by steps including (i) generating a hash table based on a first string, (ii) matching sub-strings of a second string against the first string using the hash table, (iii) recording matches in a list, and (iv) applying a threshold based at least in part on a length of common substrings between the first and second strings; and
    computer-readable code configured to group the strings in the set into clusters by a procedure which, for each string that does not already belong to a cluster, determines the binary output of the evaluation function between the string and each other string in the set that do not yet belong to any cluster.

2. The apparatus of claim 1, wherein given that the set of strings is defined as $\{S_j|j=1 \text{ to } m\}$, the computer-readable code is configured, for each string $S_j$, to determine if $S_j$ belongs to a cluster already, and if so, then to skip to the next string, and if not, then to perform a loop of instructions relating to the string $S_j$.

3. The apparatus of claim 2, wherein the loop of instructions comprises determining if a pair of strings are sufficiently related using a hash table generated based on the string $S_j$, and if so, assigning one or both strings to a cluster.

4. The apparatus of claim 3, wherein the cluster is newly created if the string $S_j$ does not yet belong to any cluster.

5. The apparatus of claim 1, wherein the set of strings comprise binary strings derived from malware payloads.

6. The apparatus of claim 1, wherein the set of strings comprise ASCII strings derived from malicious scripts.

7. The apparatus of claim 1, wherein the set of strings comprise fingerprints derived from spam messages.

8. The apparatus of claim 1, wherein the set of strings comprise document fingerprints derived from sensitive documents.

9. The apparatus of claim 1, wherein if the binary output of the evaluation function between the string and another string indicates a match, then said another string is assigned to a same cluster as the string.

10. The apparatus of claim 9, wherein the same cluster is a new cluster if the string does not belong to any cluster.

11. A computer-implemented method of efficiently grouping a set of strings into clusters of related strings, the method comprising:
- receiving the set of strings;
- determining a binary output of an evaluation function between a pair of strings by steps including (i) generating a hash table based on a first string, (ii) matching sub-strings of a second string against the first string using the hash table, (iii) recording matches in a list, and (iv) applying a threshold based at least in part on a length of common substrings between the first and second strings; and
- grouping the strings into clusters by a procedure which, for each string in said set that does not already belong to a cluster, determines the binary output of the evaluation function between the string and other strings in the set that do not yet belong to any cluster.

12. The method of claim 11, wherein given that the set of strings is defined as $\{S_j | j=1 \text{ to } m\}$, the method determines, for each string $S_j$, if $S_j$ belongs to a cluster already, and if so, then skips to the next string, and if not, then performs a loop of instructions relating to the string $S_j$.

13. The method of claim 12, wherein the loop of instructions comprises determining if a pair of strings are sufficiently related using a hash table generated based on the string $S_j$, and if so, assigning one or both strings to a cluster.

14. The method of claim 13, wherein the cluster is newly created if the string $S_j$ does not yet belong to any cluster.

15. The method of claim 11, wherein the set of strings comprise binary strings derived from malware payloads.

16. The method of claim 11, wherein the set of strings comprise ASCII strings derived from malicious scripts.

17. The method of claim 11, wherein the set of strings comprise fingerprints derived from spam messages.

18. The method of claim 11, wherein the set of strings comprise document fingerprints derived from sensitive documents.

19. The method of claim 11, wherein if the binary output of the evaluation function between the string and another string indicates a match, then said another string is assigned to a same cluster as the string, wherein the same cluster is a new cluster if the string does not belong to any cluster.

* * * * *